United States Patent [19]

Sardano

[11] 4,428,496
[45] Jan. 31, 1984

[54] VALVE ASSEMBLY

[75] Inventor: Sante P. Sardano, Rochester, N.Y.

[73] Assignee: General Motors Corporation, Detroit, Mich.

[21] Appl. No.: 410,400

[22] Filed: Aug. 23, 1982

[51] Int. Cl.³ ........................ B65D 43/14; B65D 51/04
[52] U.S. Cl. .................... 220/300; 220/293; 220/302
[58] Field of Search ............... 220/293, 300, 301, 302, 220/298

[56] References Cited

U.S. PATENT DOCUMENTS

| 2,562,505 | 7/1951 | Mueller | 220/300 |
| 2,781,148 | 2/1957 | Reddle | 220/300 |
| 3,131,952 | 5/1964 | D'Esopo | 220/293 |
| 3,136,486 | 6/1964 | Docken | 220/293 |
| 3,835,646 | 9/1974 | Rantt et al. | 60/290 |
| 4,191,014 | 3/1980 | Jones | 60/290 |
| 4,202,462 | 5/1980 | Imber | 220/293 |
| 4,339,055 | 7/1982 | Hutzenlaub | 220/293 |

*Primary Examiner*—Joseph Man-Fu Moy
*Attorney, Agent, or Firm*—C. K. Veenstra

[57] ABSTRACT

In an air management valve assembly for an automotive engine exhaust air injection system, the pressure relief valve corner has a plurality of cantilevered fingers which releasably lock the valve cover to the valve body.

2 Claims, 18 Drawing Figures

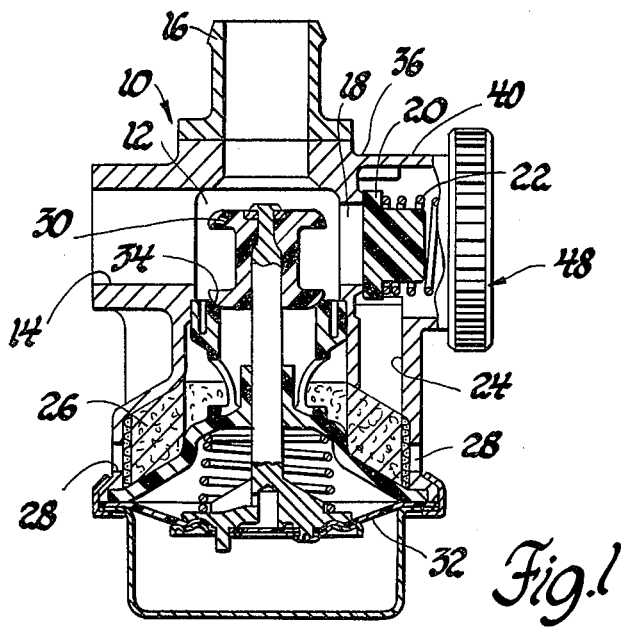
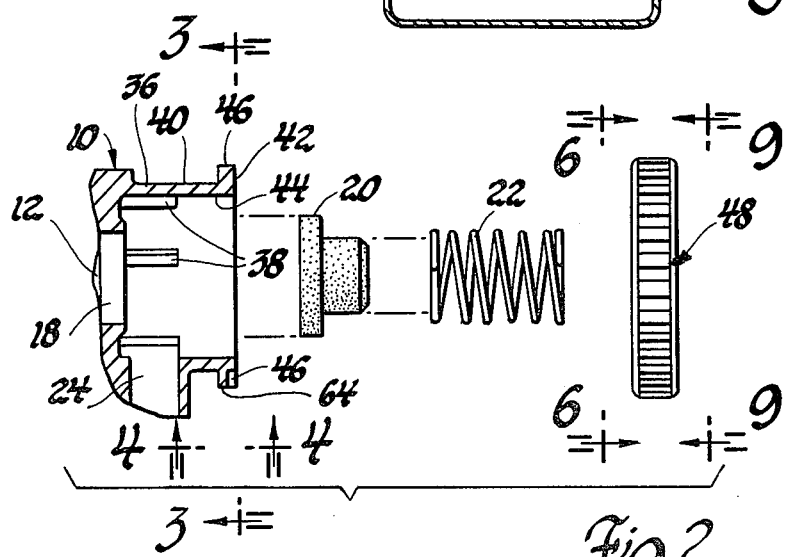
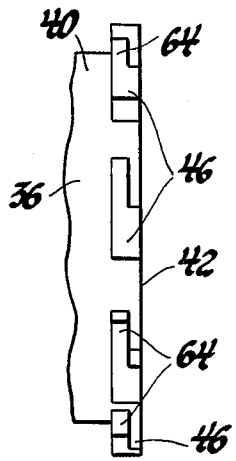
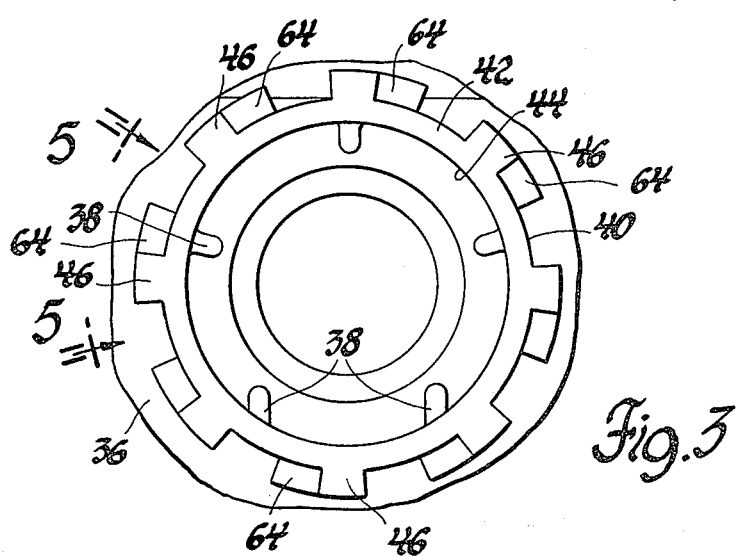
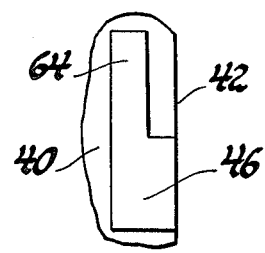

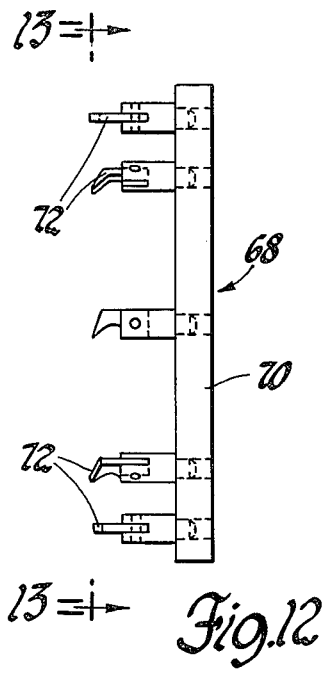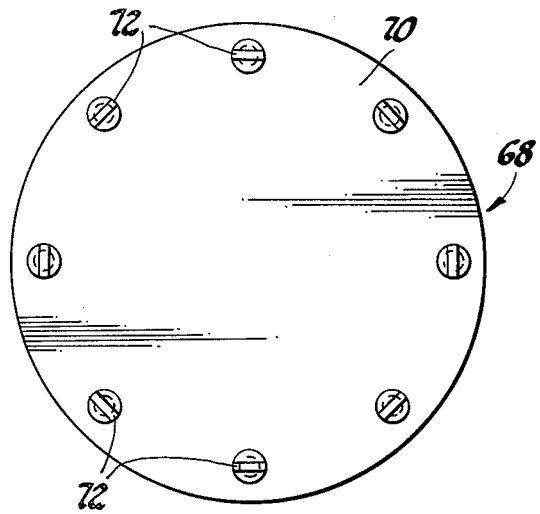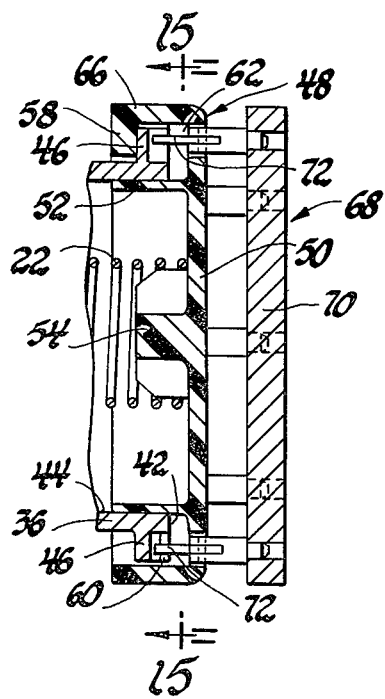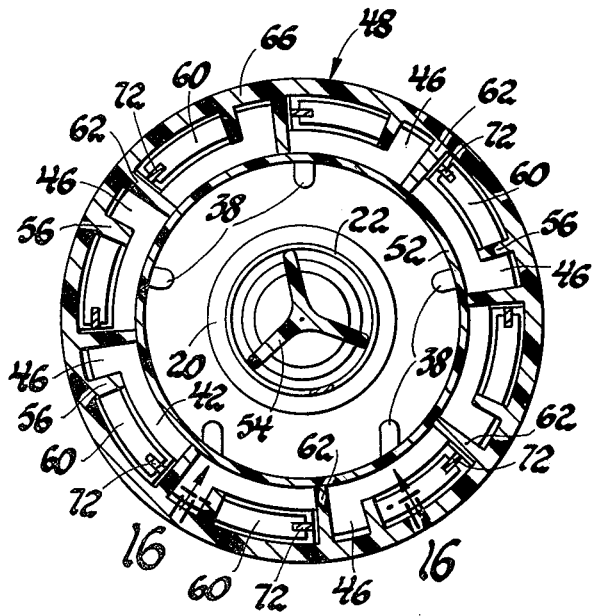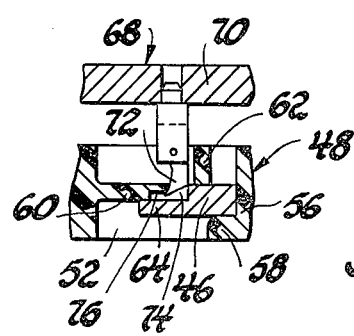

VALVE ASSEMBLY

TECHNICAL FIELD

This invention relates to a valve assembly having a cover releasably locked to a valve body.

BACKGROUND

Many automotive engines have an air pump which delivers air for injection into the engine exhaust system to support oxidation of hydrocarbons and carbon monoxide. In such a system, the air pump is engine driven, and the pressure of the air delivered by the pump increases with the speed of the engine. However, the pressure of the air injected into the exhaust system must be limited to a predetermined maximum, and automotive air injection systems generally include a pressure relief valve which allows the excess air delivered by the pump to be directed away from the exhaust system.

The pressure relief valve is often included in an air management valve assembly which controls air flow to the exhaust system in accordance with operating conditions. The various functions of the air management value assembly are tested at the manufacturing plant; prior to this invention, the pressure relief valve was not accessible for repair, and the entire air management valve assembly had to be scrapped if a test showed that the pressure relief valve was not performing in the required manner.

SUMMARY OF THE INVENTION

This invention provides a valve assembly which has a valve cover releasably locked to a valve body. With this invention, therefore, the cover to a defective pressure relief valve may be removed to permit repair.

In a valve assembly according to this invention, the valve body has an opening providing access to the pressure relief valve. The wall surrounding the opening has a plurality of peripherally spaced, radially projecting lugs. The valve cover has a lid which engages the valve body to close the opening and a plurality of webs which project radially from the lip and extend axially along the body adjacent the lugs; the webs engage the lugs to prevent rotation of the lugs in one direction upon the body. Each of the webs has a foot extending peripherally about the body and engaging behind one of the lugs to prevent withdrawal of the cover axially from the body. Each of the webs also has a cantilevered finger extending peripherally about the body and engaging one of the lugs to prevent counter rotation of the cover in the other direction upon the body. With this construction, the cover is locked to the body but may be removed from the body by employing a tool which simultaneously lifts each of the fingers to permit counter rotation of the cover on the body—with the fingers sliding over the lugs and the feet sliding out from behind the lugs—followed by withdrawal of the cover axially from the body.

The details as well as other features and advantages of the preferred embodiment of this invention are set forth in the remainder of the specification and are shown in the drawings.

SUMMARY OF THE DRAWINGS

FIG. 1 is a view of an air management valve assembly employing the preferred embodiment of this invention and having parts broken away to illustrate its internal construction.

FIG. 2 is an exploded view of the pressure relief valve section of the air management valve assembly.

FIG. 3 is an end view, indicated by line 3—3 of FIG. 2, of the portion of the valve body which receives the valve cover.

FIG. 4 is a side view, indicated by line 4—4 of FIG. 2, of the portion of the valve body which receives the valve cover.

FIG. 5 is a view, indicated by the line 5—5 of FIG. 3, of a lug on the valve body.

FIG. 12 is a side view of a tool employed to lift the fingers to permit removal of the valve cover from the valve body.

FIG. 13 is a plan view, indicated by the line 13—13 of FIG. 12, of the tool.

FIG. 14 is a view showing the tool engaged with the valve cover to lift the fingers.

FIG. 15 is a sectional view, indicated by the line 15—15 of FIG. 14, also showing the tool engaged with the valve cover to lift the fingers.

FIG. 16 is a sectional view, indicated by the line 16—16 of FIG. 15, further showing the tool engaged with the valve cover to lift the fingers.

THE PREFERRED EMBODIMENT

Figure 6:
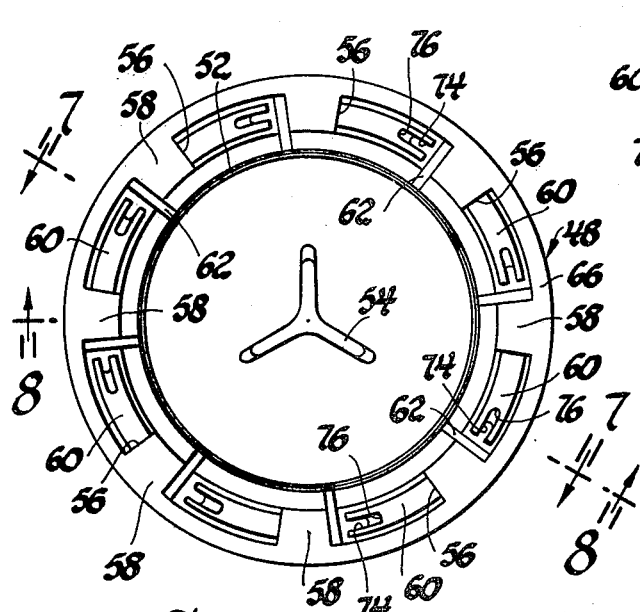
FIG. 6 is a view, indicated by the line 6—6 of FIG. 2, of the inside of the valve cover.
Figure 7:
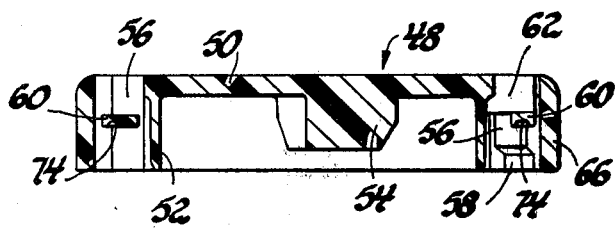
FIG. 7 is a sectional view, indicated by the line 7—7 of FIG. 6, showing constructional details of the valve cover.
Figure 8:
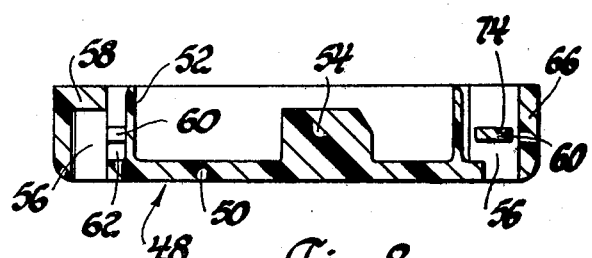
FIG. 8 is a sectional view, indicated by the line 8—8 of FIG. 6, showing additional constructional details of the valve cover.
Figure 9:
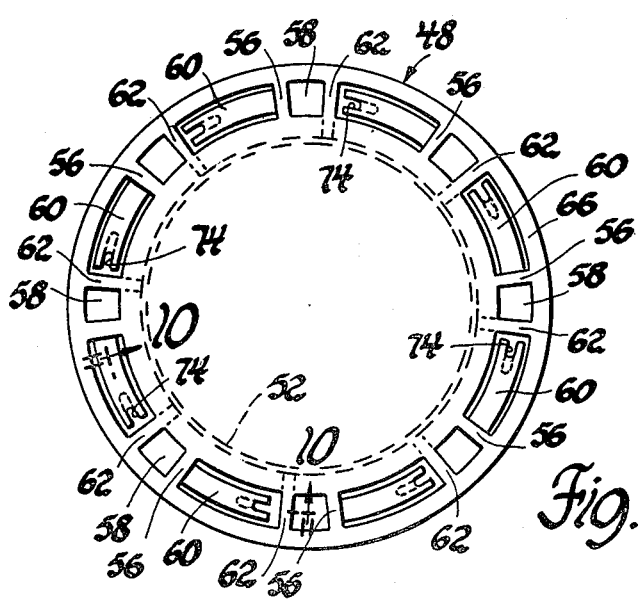
FIG. 9 is a view, indicated by the line 9—9 of FIG. 2, of the outside of the valve cover.
Figure 10:
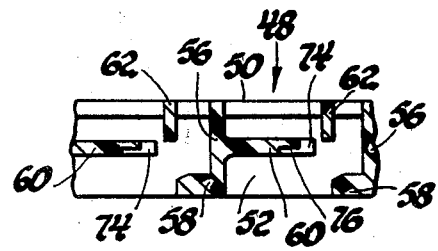
FIG. 10 is a sectional view, indicated by the line 10—10 of FIG. 9 illustrating the relationship of the parts of the valve cover which interlock with the lugs on the valve body.

Referring first to FIG. 1, an air management valve assembly 10 has a plenum 12 which receives air through an air inlet 14 from an engine driven air pump. Plenum 12 has an outlet 16 for directing air to an engine exhaust system.

Plenum 12 also has an outlet 18 controlled by a pressure relief valve 20. A sping 22 biases valve 20 to close outlet 18. However, should the pressure in plenum 12 increase above the bias of spring 22, valve 20 will be displaced rightwardly against the bias of spring 22 and a portion of the air delivered into plenum 12 will escape through opening 18. Air flowing through opening 18 is directed downwardly through a channel 24 into a silencer element 26 and then escapes through a plurality of apertures 28 to the atmosphere.

Valve assembly 10 further includes a diverter valve 30 operated by a diaphragm 32. When diaphragm 32 receives a vacuum signal, valve member 30 seats across outlet 16 to obstruct air flow to the exhaust system and opens an outlet 34 which diverts the air flow through silencer element 26 and apertures 28 to the atmosphere. Additional details of the structure and operation of valve assembly 10 are set forth in U.S. Pat. No. 3,835,646 and need not be set forth here. It will be appreciated, moreover, that the invention as described below may be employed in other kinds of valve assemblies, particularly in other air management valve assemblies which differ from the structure and/or function of valve assembly 10 as described above.

As shown in FIG. 2, a portion of the body 36 of valve assembly 10 has a plurality of inner ribs 38 which support and guide pressure relief valve 20. This portion of body 36 has a cylindrical outside wall 40 and an annular end wall 42 which defines an opening 44 through which pressure relief valve 20 is assembled into body 36.

Outside wall 40 has a plurality of peripherally spaced, radially projecting lugs 46.

A cover 48 is assembled on valve body 36. Cover 48 is a single piece molded of plastic and includes a central lid 50 having a cylindrical projection 52 which engages in valve body opening 44 to close opening 44. Lid 50 also has a three-pronged projection 54 which receives and positions pressure relief valve spring 22.

Cover 48 also includes a plurality of webs 56 which project radially from lid 50 and extend axially along valve body 36 next to lugs 46. Each web 56 is provided with a foot 58 extending peripherally about body 36 and adapted to engage behind a lug 46. Each web also has a cantilevered finger 60 which extends peripherally about body 36.

Figure 11A:
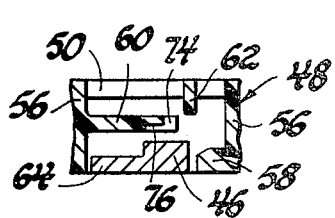
FIGS. 11a, 11b and 11c are views similar to that of FIG. 10 showing stages in the assembly of the valve cover on the valve body.
Figure 11B:
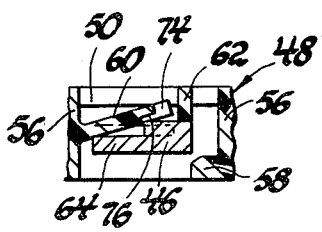
Figure 11C:
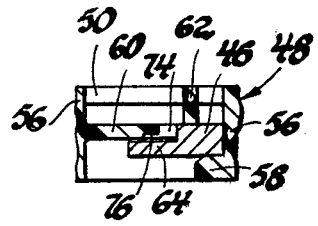

As shown in FIGS. 11a, 11b and 11c, cover 48 is assembled on valve body 36 by placing cover 48 on body 36 with lug 46 received in the space between web 56 and foot 58. Cover 48 is pushed axially onto body 36 so that lug 46 deflects finger 60 sufficiently to allow foot 58 to slide behind lug 46 as cover 48 is rotated in one direction upon body 36. The engagement of foot 58 with lug 46 then prevents withdrawal of cover 48 axially from body 36, and the engagement of web 56 with lug 46 prevents further rotation of cover 48 in one direction on body 36. As cover 48 is rotated to engage foot 58 behind lug 46, finger 60 snaps down to engage the end of finger 60 with lug 46, thereby preventing counter rotation of cover 48 in the other direction upon body 36.

Cover 48 also has a plurality of stops 62 extending radially from lid 50. Stops 62 engage lugs 46 when cover 48 has been pushed on body 36 sufficiently to allow feet 58 to engage behind lugs 46.

Each lug 46 has a peripherally extending projection 64. Each projection 64 extends toward the next web 56 and aligns its lug 46 within the space between an associated foot 58 and the next web 56 to assure that lugs 46 engage stops 62 as cover 48 is pushed on body 36. This construction assures that fingers 60 will not be overly deformed by lugs 46 as cover 48 is pushed on body 36.

Cover 48 also has a rim 66 supported by webs 56 and stops 62 to protect fingers 60 and to provide a grip for installing cover 48 on body 36.

As may be seen from FIG. 11c, cover 48 may be removed from body 36 only by lifting fingers 60 to allow fingers 60 to slide over lugs 46. Cover 48 then may be rotated to slide feet 58 out from behind lugs 46, thereby permitting withdrawal of cover 48 axially from body 36.

A tool 68 is employed to simultaneously lift all of fingers 60. Tool 68 has a plate 70 supporting a plurality of lifting hooks 72. Each hook 72 is adapted to reach through a slot 74 at the end of a finger 60 and into a groove 76 extending from slot 74 on the inner side of finger 60. With lifting hooks 72 engaged in grooves 76, further rotation of tool 68 lifts fingers 60 and allows counter rotation of cover 48 to release cover 48 from body 36

From the foregoing, it is seen that cover 48 locks itself to body 36 as cover 48 is assembled to body 36. However, cover 48 may be released from body 36 to service pressure relief valve 20.

The embodiments of the invention in which an exclusive property or privilege is claimed are defined as follows:

1. A valve assembly having a cover releasably locked to a hollow body, said body having a cylindrical outside wall and an annular end wall defining an opening into said body, said outside wall having a plurality of peripherally spaced lugs projecting radially therefrom, said cover including a lid engaging said body for closing said opening, a plurality of webs projecting radially from said lid, each of said webs extending axially along said body adjacent one of said lugs to prevent rotation of said cover in one direction upon said body, each of said webs having a foot extending peripherally about said body and engaging behind one of said lugs to prevent withdrawal of said cover axially from said body, and a finger cantilevered from each of said webs, each of said fingers extending peripherally about said body and engaging one of said lugs to prevent counter rotation of said cover in the other direction upon said body, whereby said cover may be removed from said body only by simultaneously lifting each of said fingers to permit counter rotation of said cover upon said body with said fingers sliding over said lugs and said feet sliding out from behind said lugs followed by withdrawal of said cover axially from said body.

2. A valve assembly hving a cover releasably locked to a hollow body, said body having a cylindrical outside wall and an annular end wall defining an opening into said body, said outside wall having a plurality of peripherally spaced lugs projecting radially therefrom, said cover including a lid having a cylindrical projection engaging said body for closing said opening, a plurality of webs projecting radially from said lid, each of said webs extending axially along said body adjacent one of said lugs to prevent rotation of said cover in one direction upon said body, each of said webs having a foot extending peripherally about said body and engaging behind one of said lugs to prevent withdrawal of said cover axially from said body, and a finger cantilevered from each of said webs, each of said fingers extending peripherally about said body and engaging one of said lugs to prevent counter rotation of said cover in the other direction upon said body, whereby said cover may be removed from said body only by simultaneously lifting each of said fingers to permit counter rotation of said cover upon said body with said fingers sliding over said lugs and said feet sliding out from behind said lugs followed by withdrawal of said cover axially from said body, said cover also including a plurality of stops projecting radially from said lid, each of said stops extending axially along said body and adapted to engage one of said lugs as said cover is installed on said body, and a cylindrical rim supported by said stops and said webs, said rim being radially spaced from said lid and extending axially along said body and surrounding said fingers and said feet, said rim providing a grip for installing said cover on said body.

* * * * *